Jan. 5, 1960 L. L. CORCORAN 2,920,155
INDICATING AND CONTROLLING APPARATUS
Filed May 27, 1958 6 Sheets-Sheet 1

INVENTOR
LEWIS L. CORCORAN
BY
Cornelius Zabriskie
ATTORNEY

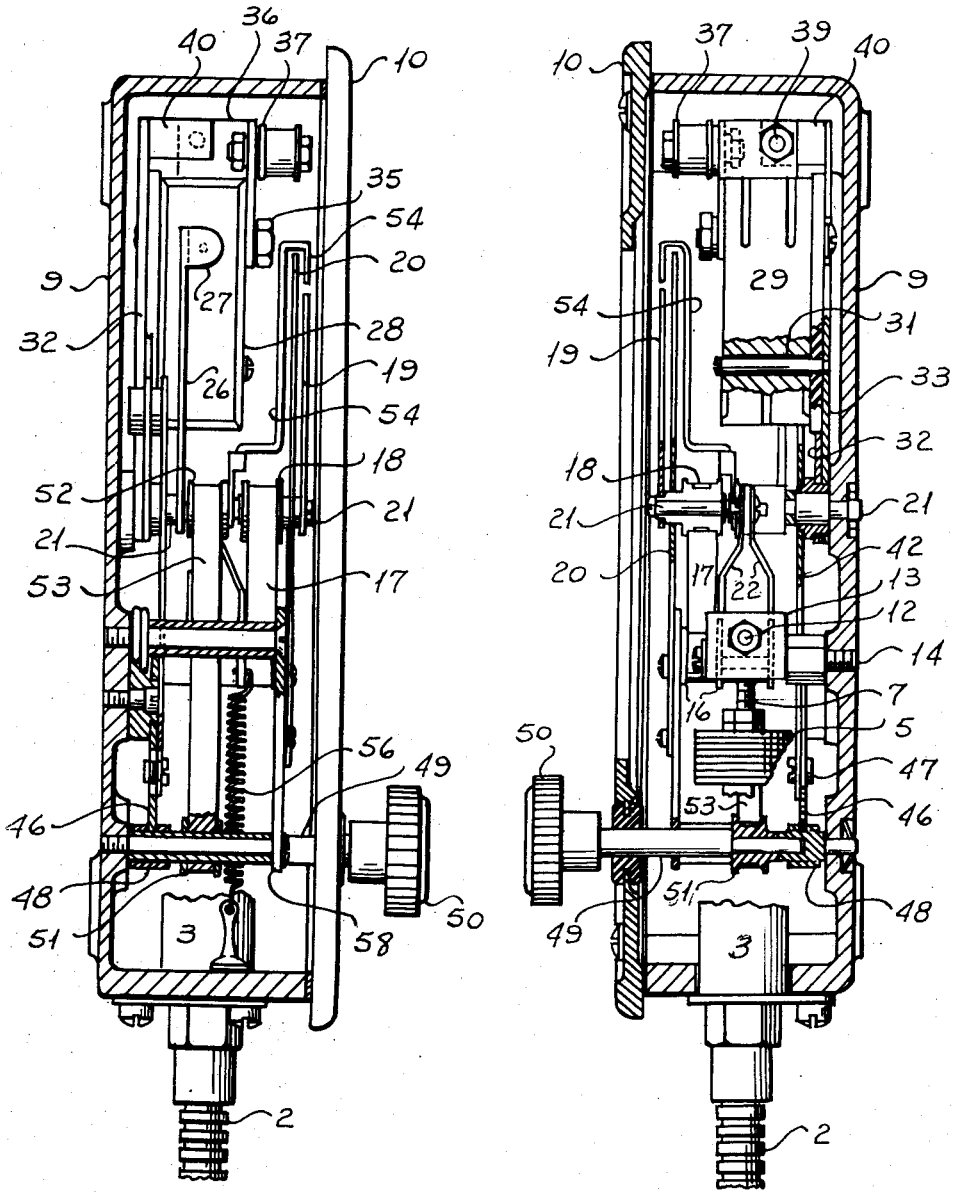

Jan. 5, 1960 L. L. CORCORAN 2,920,155
INDICATING AND CONTROLLING APPARATUS
Filed May 27, 1958 6 Sheets-Sheet 4
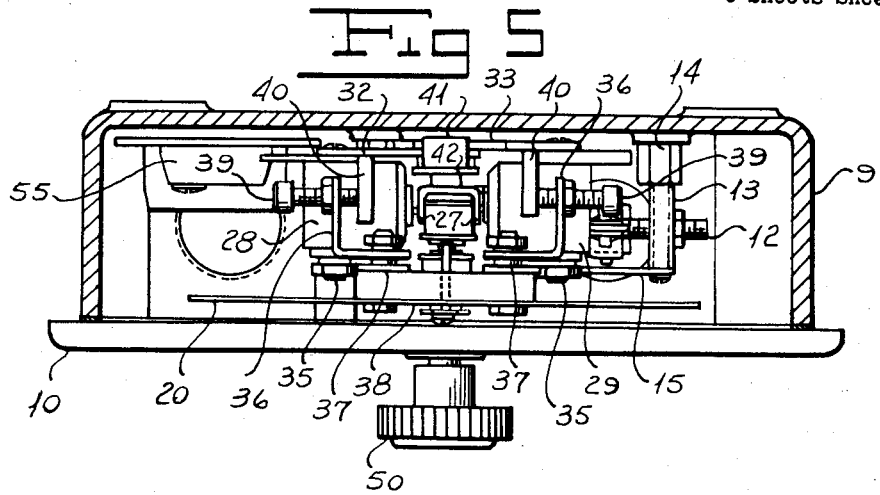
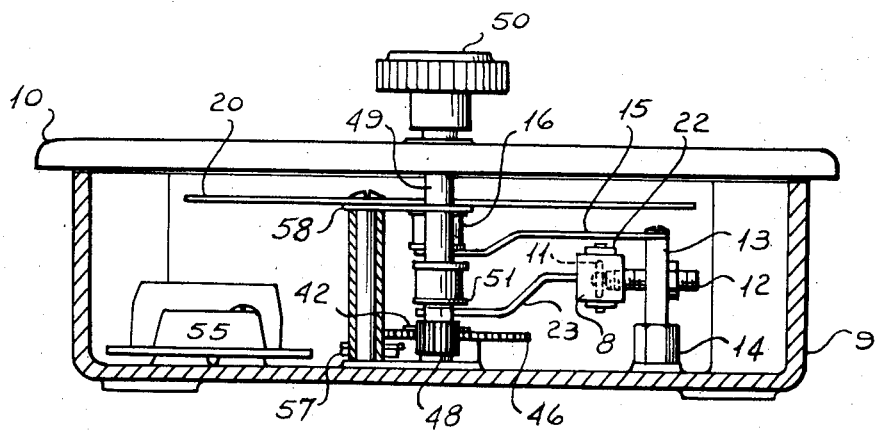
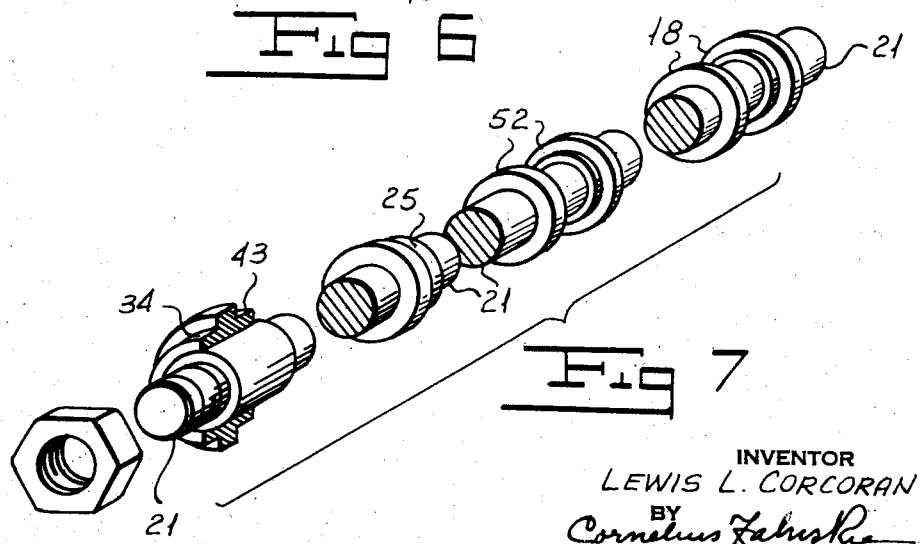
INVENTOR
LEWIS L. CORCORAN
BY
Cornelius Zabriskie
ATTORNEY Jan. 5, 1960     L. L. CORCORAN     2,920,155
INDICATING AND CONTROLLING APPARATUS
Filed May 27, 1958     6 Sheets-Sheet 5

INVENTOR
LEWIS L. CORCORAN
BY
ATTORNEY

Jan. 5, 1960 L. L. CORCORAN 2,920,155
INDICATING AND CONTROLLING APPARATUS
Filed May 27, 1958 6 Sheets-Sheet 6
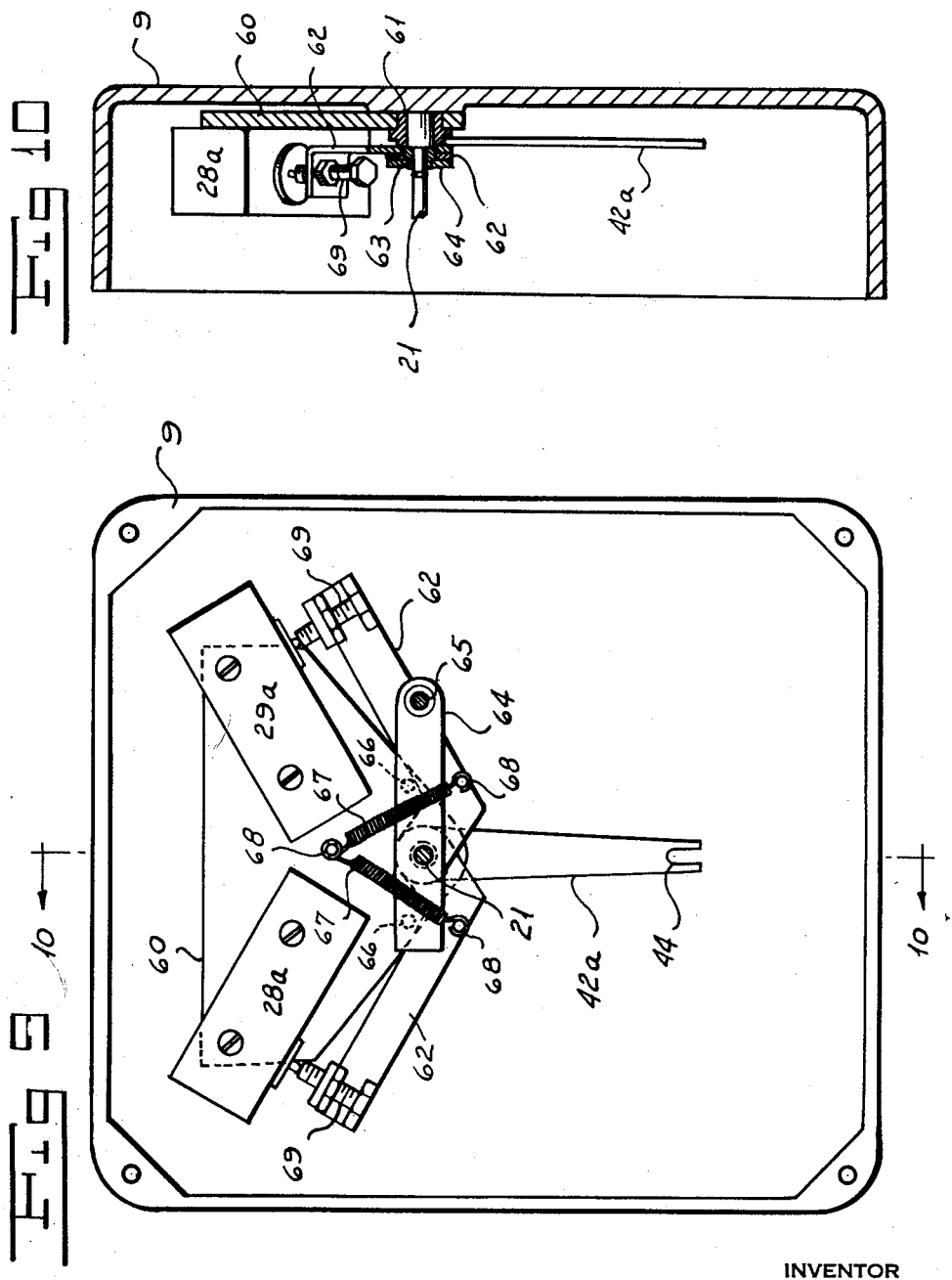
INVENTOR
LEWIS L. CORCORAN
BY
ATTORNEY United States Patent Office
2,920,155
Patented Jan. 5, 1960

2,920,155

INDICATING AND CONTROLLING APPARATUS

Lewis Lamont Corcoran, Bethlehem, Pa., assignor to Sarco Company, Inc., New York, N.Y., a corporation of New York Application May 27, 1958, Serial No. 738,224

18 Claims. (Cl. 200—56)

This invention is an indicating and controlling apparatus such, for example, as a gauge adapted to indicate temperature or pressure at a remote point at all times and to control such temperature or pressure, as may be predetermined by the operator.

Generally speaking, my apparatus accomplishes these results through the control of electric circuits which, in practice, effect the turning on or off of a burner associated with a steam generating system or a motor for initiating or discontinuing the operation of a compressor or for controlling the operations of electrically operated valves, liquid flow and liquid level control devices, or any other desired mechanisms which it is desired to automatically govern.

Gauges for these purposes have heretofore been made. They usually embody a graduated dial having associated therewith two pointers, one of which serves to indicate the temperature or pressure in the space to be controlled and the other of which is manually adjustable to indicate the pressure or temperature, as the case may be, at which it is desired to effect initiation or cessation of operation of the means for generating such temperature or pressure in said space. Their operating parts are connected through gears, pinions, links and the like, the ratio of transmission of motion through which is not constant but varies because of irregularities, clearances and lost motion.

One object of the present invention is to provide a gauge wherein the operating parts are devoid of gearing and links, whereby I obtain a smoothly operating mechanism with practically no lost motion and one which will effectually and efficiently accurately translate rectilinear motion into rotary movement in a smooth and dependable manner which is not possible when links are employed, for with prior linkages the motion is not transmitted linearly and equal increments of movement for an equal increment of the driving part is not obtained.

Prior gauges are of two different types. According to some of them, there is a direct gearing connection between the controlling mechanism and the indicating mechanism. These gauges have not proven satisfactory for, inter alia, inaccuracies in the operation of one train of mechanism is introduced into the other train with accumulated error. In other gauges, the two mechanisms have been controlled independently of one another but in those cases, separate initiating means, such as separate Bourdon tubes or bellows, were required for each train of mechanism.

An important object of this invention is to provide a gauge wherein both trains of mechanism are operated from a common prime mover without actual interconnection with one another, whereby the temperature indicating mechanism is free of influence by the operation of the switching mechanism, and vice versa. For the common prime mover, I may employ a bellows, Bourdon tube, piston or bimetallic element, as desired.

In practically all prior pressure operated gauges which serve in the carrying out of their functions to close electric circuits or perform other control means, the actuation of such control means imposes variations in load on the actuating means. One object of this invention is to eliminate this variation in load as will be hereinafter more fully explained.

All prior gauges of which I am aware, which employ separate controlling indicating and controlling mechanism, are so constituted that the travel of the indicating and controlling pointers over the scale of the dial is confined to the relatively limited arc. This requires relatively closely spaced graduations on the dial scale which are difficult to read, particularly for the purpose of adjustment. Another object of this invention is to so construct a gauge that the dial graduations are spread over a much greater portion of the circumference of the dial and may be thus spaced further apart, to permit much easier reading and closer and more accurate adjustment of the gauge.

Another object of the invention is to materially simplify gauge construction and minimize the number of parts used therein.

A further object of the invention is to economize in the costs of manufacture of the gauge and at the same time produce a gauge of maximum simplicity and accuracy in adjustment and calibration.

An important feature of this invention comprises the transmission of power and movement from different parts of the gauge to other parts thereof, through the employment of flat spring strips of the character disclosed in United States Patent No. 2,609,192. These spring strips have formed transverse curvature and are stressed to normally wrap themselves into a tightly wound spiral, in which form they are in minimum stressed condition.

I employ this general type of spring strip by attaching the opposite ends thereof, respectively, to spaced apart driving and driven pulleys about which the opposite end portions of the strip autogeneously coil in tight spirals. With this arrangement, rotation of the driving pulley will cause an unwinding of a longitudinal portion of such strip from the driving pulley, with concurrent winding of a corresponding longitudinal portion of the strip upon the driven pulley, with practically no friction. I use this arrangement of pulleys for the setting of switch closing means which I employ.

Another like pulley and spring strip assembly is employed to control temperature indicating means through bodily movement of the driving pulley toward and away from the driven pulley without concurrent rotation of the former. This relative movement between the pulleys will effect a winding or unwinding of a portion of a greater or lesser portion of the strip in a tight spiral on the driven pulley and produce relatively great amplitude of a pointer movable with the driven pulley and operable over a dial.

There are thus two trains of mechanism, viz., a train of temperature indicating mechanism and a separate train of electric current switching mechanism. These trains are wholly independent of one another but in accordance with this invention they are operate entirely independently of one another by a common actuating member, the position of which is controlled by a single temperature responsive prime mover, preferably in the form of a bellows. The current switching mechanism serves to open and close circuits for controlling the operation of one or more motors to carry out the purposes of the gauge.

Features of the invention, other than those adverted to, will be apparent from the hereinafter detailed description and appended claims, when read in conjunction with the accompanying drawings.

The accompanying drawings illustrate different practical embodiments of the invention, but the constructions therein shown are to be understood as illustrative, only, and not as defining the limits of the invention.

Fig. 3 is a vertical section taken on the line 3—3 of Fig. 2, showing the cover and dial in place, but with one switch and wiring omitted.

Fig. 4 is a section on the line 4—4 of Fig. 2 with certain parts shown in section and certain parts broken away and with wiring omitted.

Fig. 5 is a transverse section on the line 5—5 of Fig. 2 with wiring omitted.

Fig. 6 is a similar transverse section on the line 6—6 of Fig. 2.

Fig. 7 is an exploded view showing the main shaft of the gauge with the mountings for the several parts to be supported thereon.

Fig. 9 is a fragmental view showing a modified form of current switching mechanism.

Fig. 10 is a section on the line 9—9 of Fig. 9.

Figure 8:
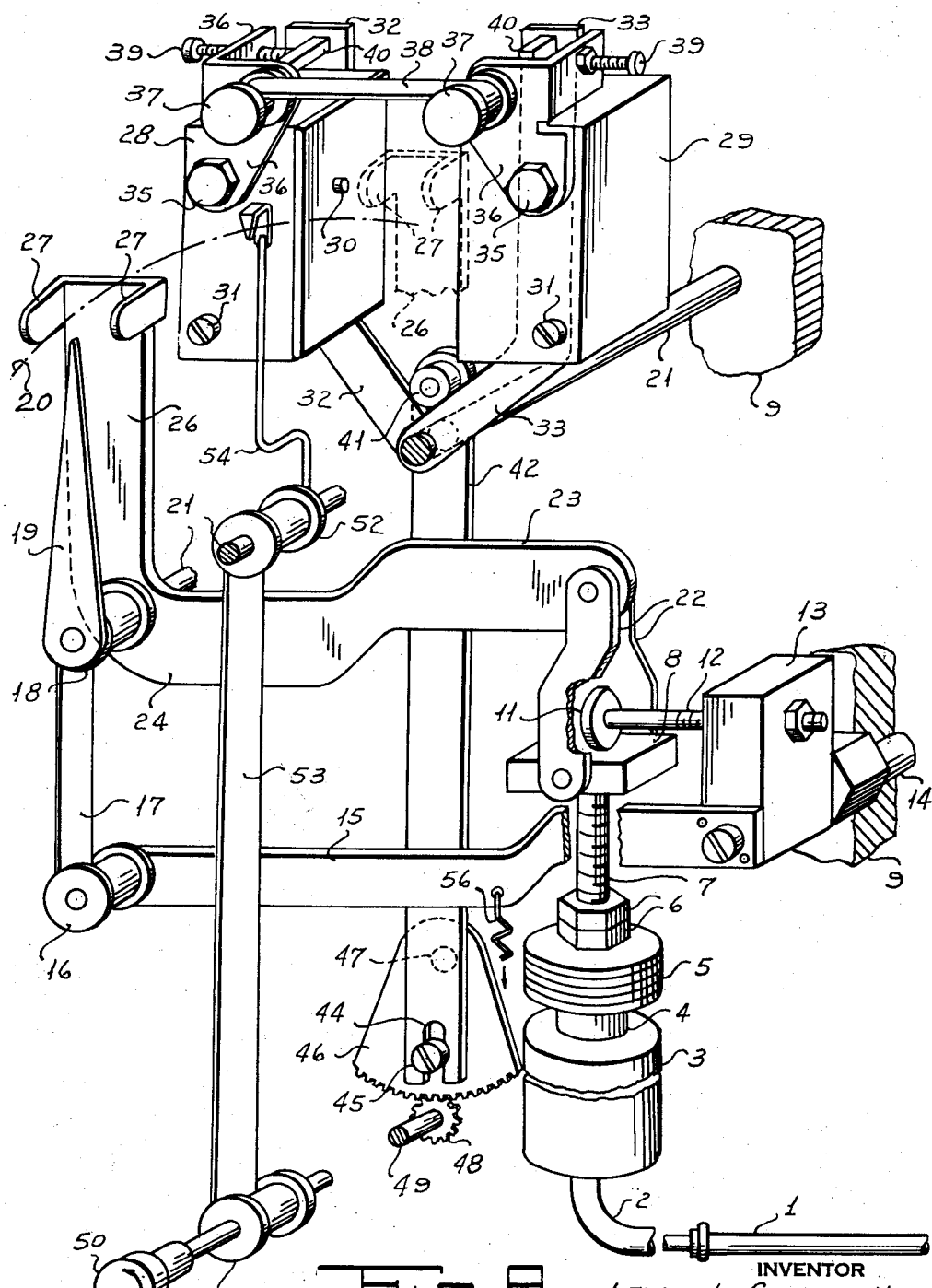
Fig. 8 is an exploded schematic view of the operating parts of the preferred form of gauge of this invention. In this view some of the parts are relatively displaced with respect to one another and some of these parts are shown somewhat out of proportion in order that their operation may be more clearly understood.

In describing the structure of the gauge shown in the drawings, I will direct attention primarily to Fig. 8 which shows the general character and relation of the functional parts of the gauge. In the course of such description, reference will be made to the remaining figures with respect, more particularly, to the mountings of these functional parts.

The thermostatic system shown in Fig. 8 is used to transmit temperature changes from a fluid and convert such temperature changes into mechanical motion. It embodies a temperature responsive bulb 1, connected by a capillary tube 2 to a casing 3 in which is mounted a conventional flexible bellows constituting the prime mover of my apparatus. The space within the bellows, the capillary tube and the bulb is filled with an expansion medium which will expand and contract with external temperature changes at the bulb. This expansion and contraction of the bulb or of the liquid in the system causes motion of the flexible bellows which, in turn, transmits motion to the rod 4. Movement of the rod 4 is transmitted through bimetallic disks 5 to adjusting nuts 6 and through these nuts to a threaded rod 7, to the upper end of which is affixed an operating block 8. The bimetallic disks 5 are used to compensate for the error which would otherwise be caused by ambient temperature changes of that part of the thermostatic system other than the bulb. All of the foregoing parts are supported on a housing 9, closed at its back and normally closed at its front by a removable front plate 10.

Vertical motion imparted by the bellows to the operating block 8, is transmitted to the head 11 of an adjusting screw 12, threaded through a block 13, supported for pivotal movement on a stud 14, rigidly mounted on the back wall of the housing 9. Fixedly secured to the block 13 is an arm 15, to the distant end of which is rigidly attached a pulley 16. To this pulley is attached one end a spring strip 17 of the character hereinbefore described in that it is transversely bowed and its ends are spirally coiled upon one another under stress.

The opposite or upper end portion of the spring strip 17 is spirally coiled about and secured to a pulley 18 to which is affixed a pointer 19 operable over a dial 20. The pulley 18 is mounted to freely rotate on a fixed main shaft 21, the rear end of which is anchored against rotation to the back wall of the housing 9. Details of this shaft and the mounting of the several parts of the gauge thereon is shown in Fig. 7, which will be referred to from time to time as this description proceeds.

With this arrangement of parts, it will be apparent that motion transmitted by the bellows to the operating block 8, will be transmitted through adjusting stem 12 to the pivoted block 13, with the result that pivotal movement of this block will cause the lower pulley 16 to raise or lower, as the case may be, and effect a corresponding winding or unwinding of the spring strip upon the upper pulley 18, to bring about movement of the pointer 19 over the graduations of the dial 20. The parts are so calibrated that the position of the pointer with respect to the dial will indicate the temperature in the space in which the bulb 1 is positioned.

Figure 1:
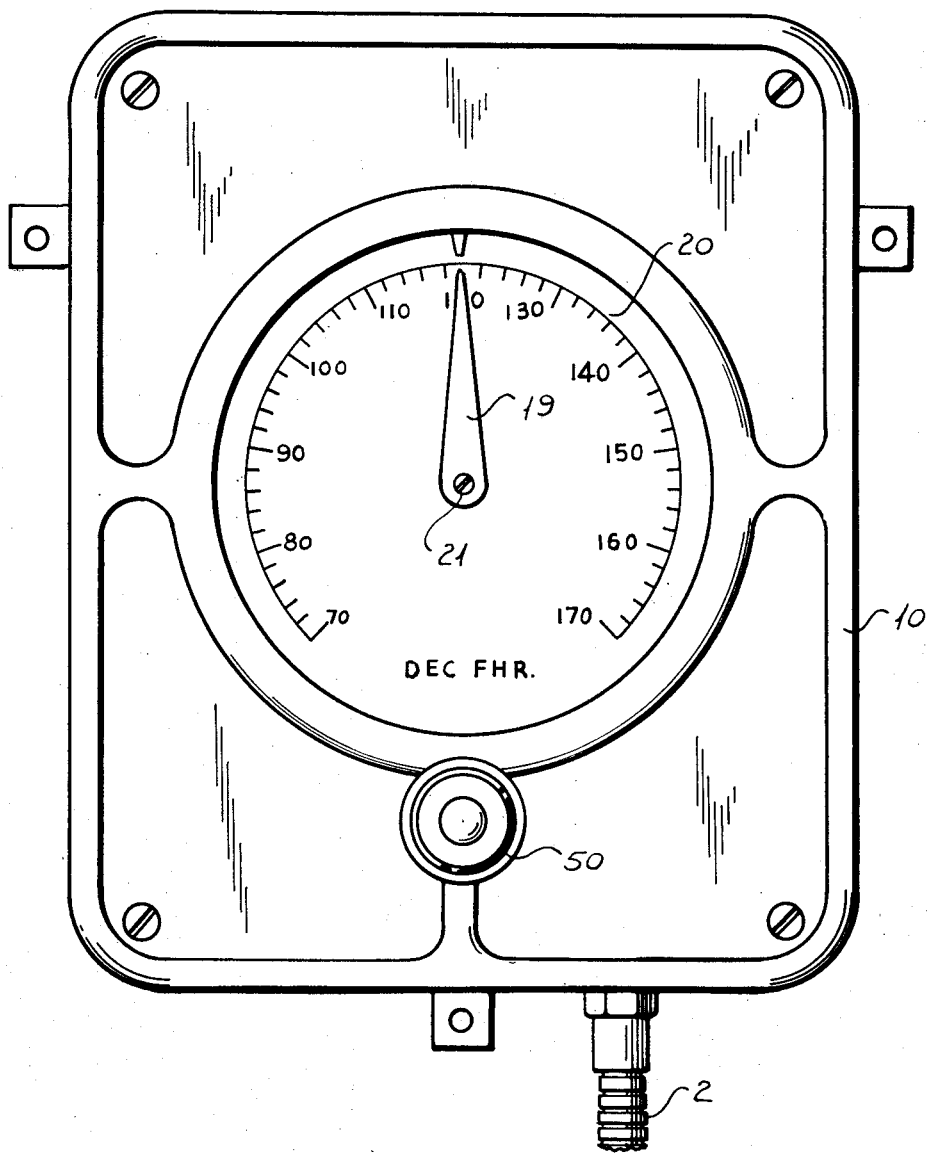
Fig. 1 is a front elevation of the gauge.

It is to be noted that with this train of indicating mechanism, I obtain relatively great amplitude in the operations of the pointer 19 and consequently the dial scale, showing indications from 70 to 170° F. in Fig. 1, may extend over by far the greater portion of the circumferential margin of the dial. The spacing of these graduations therefore is relatively wide apart and this permits of more easy reading as well as more accurate reading of the temperatures indicated by the pointer 19. The rate of motion of the pointer in relation to the motion of the block 8 may be adjusted by means of the adjusting screw 12.

Pivotally connected to the opposite sides of the operating block 8 is a yoke 22, the upper end of which is pivoted to the power arm 23 of a switch operating bell crank lever 24. This lever is fulcrumed for rotation on the main shaft 21 and is freely rotatable on a bearing 25 thereon (Fig. 7). Said bell crank lever 24 has an upstanding work arm 26, provided at its upper end with spaced apart lugs 27 adapted, through oscillation of the bell crank, to control one or more switches according to the particular environment of the gauge and the uses thereof.

In the drawings two switches 28 and 29 are illustrated. These are usually of the micro switch type with operating buttons 30. Each of these switches is pivoted at 31 on one of two switch mounting arms 32 and 33. These arms are mounted for pivotal movement on bearings 34 on a collar (Fig. 7) on the main shaft 21. To the upper portion of each switch 28, 29 and mounted on a pivot 35 is an adjusting bracket 36. Each such bracket carries a pulley 37 and with these two pulleys is associated a spring strip 38 of the character hereinbefore described. The opposite ends of the spring strip are coiled about both pulleys and anchored thereto under tension tending to draw the switches 28 and 29 toward one another. Such movement of the switches relative to the switch carrying arms 32 and 33 is controlled by adjusting screws 39 acting against stops 40 rigidly supported on said arms.

The switches 28 and 29 are positioned on opposite sides of the work arm 26 of the bell crank lever 24, as indicated in Fig. 8 by the dotted line position of the upper end of this arm. When so placed, the lugs 27 are arranged between the operating buttons 30 of the two switches, but under ordinary operating conditions are free from engagement with either button and are normally held in such spaced relation by means of a roller 41 supported on the upper end of a switch positioning lever 42. This lever is fulcrumed for pivotal movement on a bearing 43 (Fig. 7) carried by the main shaft 21 and said lever extends downwardly below said main shaft and is provided on its lower end with a slot 44. A screw 45 passes loosely through this slot and threads into a segmental adjusting gear 46 mounted on a fixed pivot 47 carried by the rear wall of the housing. A pinion 48 meshes with this gear and is secured to a shaft 49 which extends through the front plate 10 and is provided at its outer end with an adjusting knob 50. When the knob 50 is manually rotated, pinion 48 acts through the segmental gear 46 to oscillate the lever 42 and move the roller 41 at its upper end in a right or left direction, as the case may be. This movement bodily shifts the micro switches 28 and 29 in a corresponding direction, so that the spacing between the respective switch buttons 30 and the lugs 27 of the bell crank lever 24 may be varied to provide for the opening and closing of said switches in accordance with the temperatures to be regulated in the space in which the bulb 1 is positioned.

In order that the operator may have a definite indication of the nature of such adjustment and regulation, there is fixed on the shaft 49, a pulley 51 and there is mounted on the main shaft 21 a companion upper pulley 52 freely rotatable on said shaft. A spring strip 53, of the same character as hereinbefore described, extends from the pulley 51 to the pulley 52 and is secured to and coiled about both pulleys so that the rotation of the pulley 51 will impart corresponding rotation to the pulley 52 and move a pointer 54, which is rigid with said pulley 52, over the dial 20. The parts are so calibrated that the pointer will indicate, by reference to the graduations on the dial, the temperature at which one of the lugs will operate one of the micro switches and the temperature when the other lug will cause operation of the other micro switch. The operation of these switches will be controlled by the position of the roller 41 and the consequent spacing of the lugs 27 from the switch operating buttons 30.

The micro switches 28 and 29 are connected by appropriate wiring to a terminal block 55 (Fig. 2) embodying an appropriate number of binding posts which are connected to motors or other appropriate electrical devices, such, for example, as are utilized to start or shut off a motor for operating the burner of a heating system or a compressor for a cooling system, as the case may be.

By this arrangement, the temperature at which the switches open or close may be readily adjusted according to the wish of the operator. Different desired conditions may be obtained by independent adjustment of either or both of the adjusting screws 39, so as to fix the positions at which the switch pins 30 will contact with the lugs 27, but after all adjustments have been made, the operation of the gauge is entirely automatic.

It will be apparent, particularly from Fig. 8 of the drawings, that all automatic operations of the gauge are controlled by a single prime mover, i.e., the bellows in the housing 3. This bellows operates through the threaded rod 7 upon the block 8, the movements of which serve the dual purpose of registering present temperature or pressure and simultaneously controlling the mechanism which will bring about the desired change in these conditions.

By thus utilizing a single prime mover operating through separate trains of mechanism, proper initial calibration of these trains will result in absolutely true and accurate readings, as well as true and accurate control. By the utilization of the tensioned spring strips of the character which I have described, I translate rotary movement into rectilinear movement, and vice versa, in an absolutely constant manner, without appreciable friction or lost motion.

There are no gears incorporated in the operating parts of the structure. The only toothed parts involved are those on the segmental gear 46 and its adjusting pinion 48. These toothed parts form no part of the operating mechanisms. They simply provide for adjustment and any lost motion therein will have no effect upon the proper operation of the gauge. In practice, a spring 57 (Fig. 2) is provided to bear against the hub of the segmental gear 46 and apply thereto sufficient friction to preclude inadvertent movement of said gear by reactive forces exerted by the switch mounting arms 32 and 33 through the roller 41 and its switch positioning lever 42.

It is of course necessary that the head 11 of the adjusting rod be maintained at all times in proper cooperative relation with the operating block 8. This is assured by a tension spring 56 which serves to bias the lever arm 15 and the associated block 13 and thus maintain the head 11 at all times in engagement with the block 8.

From the foregoing description of the functional parts of the present gauge, the detail structures shown in the remaining figures will be well understood by those skilled in the art, for the reference numerals applied to Figs. 7 and 8 are carried over onto these other figures. These latter figures show one practical embodiment of this invention in its commercial form and with the parts thereof properly proportioned to function in a manner hereinbefore described.

Figure 2:
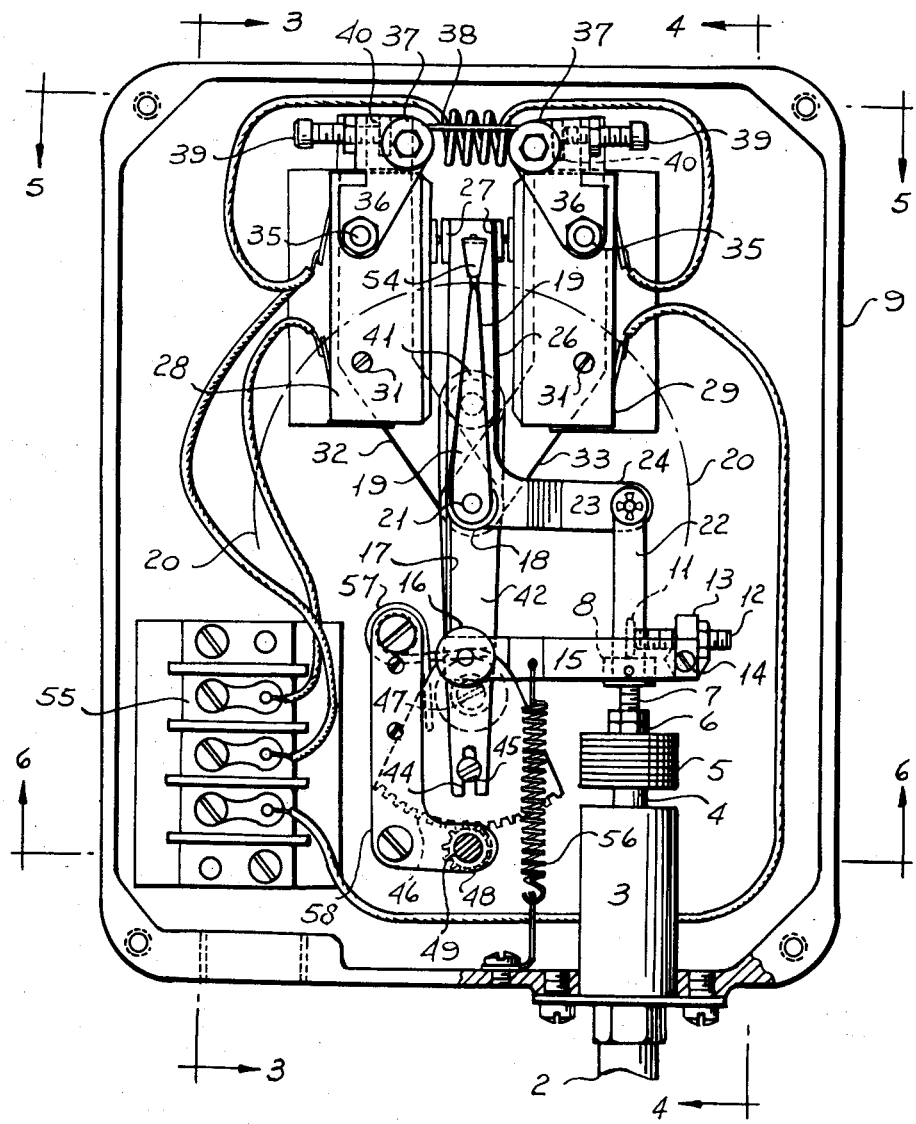
Fig. 2 is a front elevation of a commercial form of gauge with the front cover, dial and regulating knob removed and certain parts shown in section in the interest of clearness.

The wiring between the micro switches 28 and 29 and the terminal block 55 is shown in Fig. 2, while Figs. 3, 4 and 5 show the manner in which the main shaft 21, as well as the other fixed pivots are secured to and supported on the rigid back of the housing 9. The L-shaped plate 58, shown particularly in Fig. 2, and its mounting serve as a support for the dial 20, the friction spring 57 and for the inboard end of the manually adjustable shaft 49 which carries the adjusting knob 50.

The gauge, shown for purpose of illustration in Figs. 1–8 of the drawings, embodies two micro switches 28 and 29, one mounted on each of the switch mounting arms 32 and 33. If it is desired to build the gauge to operate only a single switch, one, e.g., the switch 33, may be eliminated and the pulley 37 mounted on a post rigidly supported on the wall of the housing 9. If more than two switches are required for particular installations, a plurality of switches may be supported on each of the arms 32 and 33 and the lugs 27 of the bell crank lever shaped to actuate all of them.

In the modified form of the invention shown in Figs. 9 and 10, the only changes from the embodiment of the previous figures have to do with the particular mountings of the switches and their immediate operating parts, the other parts of the construction remaining the same.

In the construction of Figs. 9 and 10, two switches 28a and 29a are rigidly supported, by the attaching screws shown, to a plate 60, fixed to a bushing 61 free to rotate on the main shaft 21. To this bushing 61 is also fixed the upper end of a lever 42a which corresponds to the lever 42 of the previous construction. The lower end of lever 42a is slotted to coact with the adjusting quadrant, as before, to preset the positions at which the switches will be operated at given temperatures.

Contact arms 62 are freely rotatable on a bushing 63 which constitutes the hub of an operating arm 64, connected by a pivot 65 to the upper end of the yoke 62 previously described, whereby said arm 64 is responsive to the operations of the operating block 8. Two posts 66 are rigid with the operating arm 64 and overlie the upper edges of the contact arms 62. The springs 67 are anchored to pins 68 on the plate 60 and on the respective arms and serve to hold the arms in contact with the posts 66 at all times except when relief on either switch is necessary due to increasing or decreasing temperature beyond that at which the switches are set. Each of the arms 62 has an adjustable contact screw 69 which permits fine adjustment of the operation of one such switch if one only is used, and of differential setting between both switches if both are used.

It will be noted that the structure of Figs. 9 and 10 permits at least eight parts employed in the previous figures to be eliminated, the manufacture of some of which parts requires rather expensive tools. This form of the invention, therefore, not only improves the functioning of the apparatus, but, also, represents a considerable economy in manufacture.

In the embodiments of this invention chosen for illustrative purposes, the apparatus is intended for the indication and control of temperature. The same apparatus may also be employed for either or both the indication and control of temperature and pressure so that reference to "temperature" wherever used in the appended claims, is to be construed as synonymous with and as to cover "pressure."

Moreover, I am aware that the portion of the apparatus used to indicate, may be employed without necessarily including the train of mechanism which effects the operation of the switches, and vice versa. Furthermore the "indicating mechanism" of this invention, may, if desired, embody any appropriate conventional form of recording device for making a permanent visual record of temperature changes on a round or circular chart or traveling tape, as, e.g., by mounting an inking stylus on the pointer 19 to travel over a moving paper tape.

The foregoing detailed description sets forth the invention in its preferred practical forms, but the invention is to be understood as fully commensurate with the appended claims.

Having thus fully described the invention, what I claim as new and desire to secure by Letters Patent is:

1. An apparatus of the character described comprising: a train of indicating mechanism, a train of current switching mechanism, a common actuating member for operating each of said trains independently of one another, and a single prime mover for operating said common actuating member.

2. An apparatus according to claim 1, wherein the train of indicating mechanism comprises a dial, a pointer movable over said dial, a driven pulley rotatable with the pointer, a driving pulley operatively connected with the common actuating member for moving the driving pulley, and a transversely curved spring strip extending across the space between the driven and driving pulleys with the opposite ends of said strip autogenously wrapped in tight spiral coils about the corresponding pulleys for imparting movement of the pointer over the dial in accordance with the movements of the common actuating member.

3. An apparatus of the character described comprising: a train of indicating mechanism, a train of current switching mechanism, a common actuating member, operating connections between the common actuating member and each of said trains for operating each of said trains independently of one another, and a single prime mover for operating the common actuating member, said train of indicating mechanism embodying a dial, a pointer movable over the dial, a driven pulley rotatable with the pointer, a driving pulley operatively connected with the common actuating member for moving the driving pulley, and a transversely curved spring strip extending across the space between the driven and driving pulleys with the opposite ends of said strip wrapped in tight spiral coils about the corresponding pulleys for imparting movement of the pointer over the dial in accordance with the movement of the common actuating member, said driving pulley being operatively connected with the common actuating member by a lever, the work arm of which carries the driving pulley and the power arm of which carries an element bearing against the common actuating member.

4. An apparatus according to claim 3, wherein said element is adjustable to regulate the throw of the lever.

5. An apparatus according to claim 1, wherein the train of current switching mechanism comprises a dial, a pointer movable over said dial, a driven pulley mounted to rotate on a fixed axis and movable with the pointer, a driving pulley, means for manually rotating the driving pulley, and a transversely curved spring strip the opposite ends of which are autogenously coiled in tight spiral about both the driving and driven pulleys.

6. An apparatus according to claim 1, wherein the train of current switching mechanism comprises at least one switch, a pivoted arm for controlling the opening and closing of said switch, and connections between the pivoted arm and the common actuating member for controlling the opening and closing of said switch in accordance with the operations of the prime mover, said prime mover being a temperature responsive prime mover.

7. An apparatus according to claim 1, wherein the train of current switching mechanism comprises a plurality of switches, a pivoted arm for controlling the opening and closing of said switches, and connections between the pivoted arm and the common actuating member for controlling the opening and closing said switches in accordance with the operations of the prime mover, said prime mover being a temperature responsive prime mover.

8. An apparatus according to claim 1, wherein the train of current switching mechanism comprises a switch, a bell crank mounted at its elbow on a fixed axis with its work arm in cooperative relation with said switch and its power arm engaging the common actuating member.

9. An apparatus according to claim 1, wherein the train of indicating mechanism comprises a graduated dial, an indicating pointer rotatable on a fixed axis for travel over the dial, operating connections between the pointer and the common actuating member to move the pointer over the dial according to the operations of the prime mover, and wherein the train of current switching mechanism comprises a switch, a switch operating arm adapted through pivotal movement to control the opening and closing of the switch, operative connections between said arm and the common actuating member to permit operation of said switch independently of the operations of said pointer, and manually operable means for bodily shifting the position of the switch with respect to the switch operating arm.

10. An apparatus of the character described comprising: a train of indicating mechanism, a train of current switching mechanism, a common actuating member for operating each of said trains independently of one another, and a single prime mover for operating said common actuating member, said train of indicating mechanism embodying a graduated dial, an indicating pointer rotatable on a fixed axis for travel over the dial, a driven pulley mounted on said fixed axis and rigid with the pointer, a lever with its power arm actuated by the common actuating member, a driving pulley carried by the work arm of said lever, and a transversely curved spring strip extending from the driving pulley to the driven pulley with its opposite end portions wrapped in tight spirals about both pulleys, said train of current switching mechanism embodying a switch, a switch operating arm adapted through pivotal movement to control the opening and closing of the switch, operative connections between said arm and the common actuating member to permit operation of said switch independently of the operations of the pointer, and manually operable means for bodily shifting the position of the switch with respect to the switch operating arm.

11. An apparatus of the character described comprising: a train of indicating mechanism, a train of current switching mechanism, a common actuating member for operating each of said trains independently of one another, and a single prime mover for operating said common actuating member, said train of indicating mechanism embodying a graduated dial, an indicating pointer rotatable on a fixed axis for travel over the dial, operating connections between the pointer and the common actuating member to move the pointer over the dial according to the operations of the prime mover, the train of current switching mechanism comprising a switch, a switch operating arm adapted through pivotal movement to control the opening and closing of the switch, operative connections between said arm and the common actuating member to permit operation of said switch independently of the operations of said pointer, and manually operable means for bodily shifting the position of the switch with respect to the switch operating arm, in combination with a second pointer also rotatable over the dial, a driven pulley rigid with the pointer, a driving pulley operated by said manually operable means, and a transversely curved spring strip extending from the driving pulley to the driven pulley with its opposite end portions wrapped in tight spirals about both pulleys.

12. An apparatus of the character described comprising: a dial, a pointer movable over the dial, a driven pulley connected to the pointer to cause the same to so move, a driving pulley spaced from the driven pulley, a transversely curved spring strip the opposite end portions of which are autogenously wrapped about both pulleys in tight spirals, a prime mover, and operating connections between the prime mover and the driving pulley for operating said driving pulley to cause the pointer to move over the dial in accordance with the operations of the prime mover.

13. An apparatus of the character described comprising: a switch operating arm, a pair of switches adjustably spaced apart on the opposite sides of said switch operating arm, two switch supporting arms on which said switches are pivoted, said arms being mounted for oscillatory movement about a fixed common axis, a pulley carried by each switch, a transversely curved spring strip extending between said pulleys with its opposite ends spirally coiled about the respective pulleys, an element bearing against both switch supporting arms and mounted on a pivoted lever which through pivotal movement of the lever effects bodily conjoint movement of both switches relative to said switch operating arm, and means for manually moving said lever to simultaneously impart conjoint bodily movement to said switches.

14. An apparatus according to claim 13, comprising additional manually adjustable means for individually regulating the spacing between said switches with respect to one another.

15. An apparatus according to claim 13, comprising a dial, a pointer movable over the dial, and operable connections between the pointer and the means for pivotally moving said lever to vary the position of the pointer in accordance with the adjusted position of the switches.

16. An apparatus according to claim 1, wherein the current switching mechanism comprises: a plate mounted for pivotal movement on a fixed axis, at least one switch supported on said plate, a contact arm pivotal on the same axis and adapted to control the operation of said switch, manually operable means for bodily shifting said plate relatively to said contact arm, a pivoted switch operating arm carrying a post for controlling the position of the contact arm, and means connecting said switch operating arm to the single prime mover to operate the former from the latter.

17. In an apparatus of the character described, a plate mounted for pivotal movement on a fixed axis, at least one switch supported on said plate, a contact arm pivotal on the same axis and adapted to control the operation of said switch, manually operable means for bodily shifting said plate relatively to said contact arm, and means for shifting said arm into and out of engagement with the switch while the switch and its supporting plate remain stationary.

18. An apparatus according to claim 17, wherein the means for shifting the contact arm into and out of engagement with the switch comprises an operating arm also pivoted on the same axis and carrying a post for controlling the position of said contact arm, and a prime mover for pivotally moving said operating arm.

References Cited in the file of this patent

UNITED STATES PATENTS

| | | |
|---|---|---|
| 2,296,189 | Rudolf | Sept. 15, 1942 |
| 2,348,362 | Rudolf | May 9, 1944 |
| 2,535,430 | Kuntny | Dec. 26, 1950 |
| 2,540,444 | Harland | Feb. 6, 1951 |
| 2,609,192 | Lermont | Sept. 2, 1952 |

FOREIGN PATENTS

| | | |
|---|---|---|
| 439,191 | Great Britain | Dec. 2, 1935 |